United States Patent
Hansen et al.

(10) Patent No.: US 9,213,609 B2
(45) Date of Patent: Dec. 15, 2015

(54) PERSISTENT MEMORY DEVICE FOR BACKUP PROCESS CHECKPOINT STATES

(75) Inventors: Roger Hansen, San Francisco, CA (US); Pankaj Mehra, San Jose, CA (US); Sam Fineberg, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1054 days.

(21) Appl. No.: 10/737,374

(22) Filed: Dec. 16, 2003

(65) Prior Publication Data

US 2005/0132250 A1      Jun. 16, 2005

(51) Int. Cl.
*G06F 11/20*      (2006.01)
*G06F 11/14*      (2006.01)

(52) U.S. Cl.
CPC ........ *G06F 11/2046* (2013.01); *G06F 11/2038* (2013.01); *G06F 11/2097* (2013.01); *G06F 11/1471* (2013.01)

(58) Field of Classification Search
CPC ............ G06F 11/2028; G06F 11/2043; G06F 11/2046; G06F 11/20; G06F 11/1407; G06F 11/2007; G06F 11/1458; G06F 11/23167; H04Q 2213/13167; H04Q 3/54558
USPC ...................................................... 714/13, 41
See application file for complete search history.

(56) References Cited

U.S. PATENT DOCUMENTS

| | | | |
|---|---|---|---|
| 4,590,554 A * | 5/1986 | Glazer et al. ................. | 714/13 |
| 5,008,786 A * | 4/1991 | Thatte ......................... | 711/162 |
| 5,446,857 A * | 8/1995 | Russ ........................... | 711/100 |
| 5,546,534 A * | 8/1996 | Malcolm ...................... | 714/6 |
| 5,715,386 A | 2/1998 | Fulton, III et al. | |
| 5,721,918 A * | 2/1998 | Nilsson et al. ............... | 707/202 |
| 5,751,997 A * | 5/1998 | Kullick et al. ............... | 711/162 |
| 5,842,222 A * | 11/1998 | Lin et al. .................... | 1/1 |
| 5,845,082 A * | 12/1998 | Murakami .................... | 709/226 |
| 5,864,657 A * | 1/1999 | Stiffler ........................ | 714/15 |
| 5,864,849 A * | 1/1999 | Bohannon et al. ............ | 707/8 |
| 6,044,475 A * | 3/2000 | Chung et al. ................. | 714/15 |
| 6,079,030 A * | 6/2000 | Masubuchi .................. | 714/15 |
| 6,088,773 A * | 7/2000 | Kano et al. .................. | 711/161 |

(Continued)

FOREIGN PATENT DOCUMENTS

| | | | |
|---|---|---|---|
| JP | 2002140315 A | 5/2002 | |
| JP | 2003015901 A | 1/2003 | |
| JP | 2001175042 A | 6/2011 | |

OTHER PUBLICATIONS

DE Office Action (with translation), German Patent Office, Jul. 26, 2011, Munchen, Germany.

*Primary Examiner* — Loan L. T. Truong
(74) *Attorney, Agent, or Firm* — Koestner Bertani LLP

(57) ABSTRACT

A system is described that includes a network interface attached to a persistent memory unit. The persistent memory unit is configured to receive checkpoint data from a primary process, and to provide access to the checkpoint data for use in a backup process, which provides recovery capability in the event of a failure of the primary process. The network interface is configured to provide address translation information between virtual and physical addresses in the persistent memory unit. In other embodiments, the persistent memory unit is capable of storing multiple updates to the checkpoint state. The checkpoint state and the updates to the checkpoint state, if any, can be retrieved by the backup process periodically, or all at once upon failure of the primary process.

37 Claims, 5 Drawing Sheets

(56) References Cited

U.S. PATENT DOCUMENTS

| | | | |
|---|---|---|---|
| 6,105,148 A * | 8/2000 | Chung et al. | 714/16 |
| 6,141,773 A * | 10/2000 | St. Pierre et al. | 714/20 |
| 6,185,702 B1 * | 2/2001 | Shirakihara et al. | 714/38 |
| 6,195,760 B1 * | 2/2001 | Chung et al. | 714/4 |
| 6,266,781 B1 * | 7/2001 | Chung et al. | 714/4 |
| 6,279,119 B1 * | 8/2001 | Bissett et al. | 714/12 |
| 6,374,264 B1 * | 4/2002 | Bohannon et al. | 707/202 |
| 6,546,404 B1 * | 4/2003 | Davis et al. | 1/1 |
| 6,622,263 B1 * | 9/2003 | Stiffler et al. | 714/13 |
| 6,678,704 B1 * | 1/2004 | Bridge et al. | 707/202 |
| 6,691,245 B1 * | 2/2004 | DeKoning | 714/6 |
| 6,704,831 B1 * | 3/2004 | Avery | 710/310 |
| 6,721,806 B2 * | 4/2004 | Boyd et al. | 719/312 |
| 6,742,136 B2 * | 5/2004 | Christensen et al. | 714/5 |
| 6,823,474 B2 * | 11/2004 | Kampe et al. | 714/13 |
| 6,836,830 B1 * | 12/2004 | Yamagami et al. | 711/162 |
| 6,883,068 B2 * | 4/2005 | Tsirigotis et al. | 711/133 |
| 6,941,410 B1 * | 9/2005 | Traversat et al. | 711/6 |
| 6,957,237 B1 * | 10/2005 | Traversat et al. | 707/206 |
| 6,983,303 B2 * | 1/2006 | Pellegrino et al. | 709/203 |
| 7,065,620 B2 * | 6/2006 | Ballard et al. | 711/162 |
| 7,069,307 B1 * | 6/2006 | Lee et al. | 709/217 |
| 7,080,221 B1 * | 7/2006 | Todd et al. | 711/161 |
| 7,082,553 B1 * | 7/2006 | Wang | 714/38 |
| 7,099,901 B2 * | 8/2006 | Sutoh et al. | 1/1 |
| 7,165,186 B1 * | 1/2007 | Viswanatham et al. | 714/1 |
| 7,222,194 B2 * | 5/2007 | Kano et al. | 709/248 |
| 7,251,747 B1 * | 7/2007 | Bean et al. | 714/18 |
| 7,260,737 B1 * | 8/2007 | Lent et al. | 714/5 |
| 7,308,607 B2 * | 12/2007 | Reinhardt et al. | 714/25 |
| 7,418,626 B2 * | 8/2008 | Aino et al. | 714/12 |
| 7,487,390 B2 * | 2/2009 | Saike | 714/13 |
| 7,529,897 B1 * | 5/2009 | Waldspurger et al. | 711/162 |
| 7,577,692 B1 * | 8/2009 | Corbett et al. | 1/1 |
| 7,716,323 B2 * | 5/2010 | Gole et al. | 709/224 |
| 8,261,125 B2 * | 9/2012 | Wenzel | 714/6.3 |
| 8,631,133 B1 * | 1/2014 | Jonnala et al. | 709/227 |
| 2002/0026604 A1 * | 2/2002 | Bissett et al. | 714/12 |
| 2002/0032691 A1 * | 3/2002 | Rabii et al. | 707/200 |
| 2002/0032883 A1 * | 3/2002 | Kampe et al. | 714/16 |
| 2002/0073325 A1 * | 6/2002 | Ho et al. | 713/189 |
| 2002/0087916 A1 * | 7/2002 | Meth | 714/16 |
| 2002/0103819 A1 * | 8/2002 | Duvillier et al. | 707/206 |
| 2002/0120791 A1 * | 8/2002 | Somalwar et al. | 709/330 |
| 2002/0124117 A1 * | 9/2002 | Beukema et al. | 709/314 |
| 2002/0184398 A1 * | 12/2002 | Orenshteyn | 709/310 |
| 2003/0018828 A1 * | 1/2003 | Craddock et al. | 719/312 |
| 2003/0093627 A1 * | 5/2003 | Neal et al. | 711/153 |
| 2003/0120864 A1 * | 6/2003 | Lee et al. | 711/114 |
| 2003/0163780 A1 * | 8/2003 | Kossa | 715/500 |
| 2003/0221075 A1 | 11/2003 | Achiwa et al. | |
| 2004/0025052 A1 * | 2/2004 | Dickenson | 713/201 |
| 2004/0030731 A1 * | 2/2004 | Iftode et al. | 707/205 |
| 2004/0034814 A1 * | 2/2004 | Thompson | 714/35 |
| 2004/0037319 A1 * | 2/2004 | Pandya | 370/469 |
| 2004/0049580 A1 * | 3/2004 | Boyd et al. | 709/226 |
| 2004/0049600 A1 * | 3/2004 | Boyd et al. | 709/250 |
| 2004/0049774 A1 * | 3/2004 | Boyd et al. | 719/312 |
| 2004/0111523 A1 * | 6/2004 | Hall et al. | 709/230 |
| 2004/0148360 A1 * | 7/2004 | Mehra et al. | 709/212 |
| 2004/0225719 A1 * | 11/2004 | Kisley et al. | 709/212 |
| 2004/0230862 A1 * | 11/2004 | Merchant et al. | 714/6 |
| 2004/0260726 A1 * | 12/2004 | Hrle et al. | 707/104.1 |
| 2005/0015460 A1 * | 1/2005 | Gole et al. | 709/213 |
| 2005/0129039 A1 * | 6/2005 | Biran et al. | 370/412 |
| 2005/0138461 A1 * | 6/2005 | Allen et al. | 714/4 |
| 2005/0144310 A1 * | 6/2005 | Biran et al. | 709/234 |
| 2005/0251785 A1 * | 11/2005 | Vertes et al. | 717/105 |

* cited by examiner

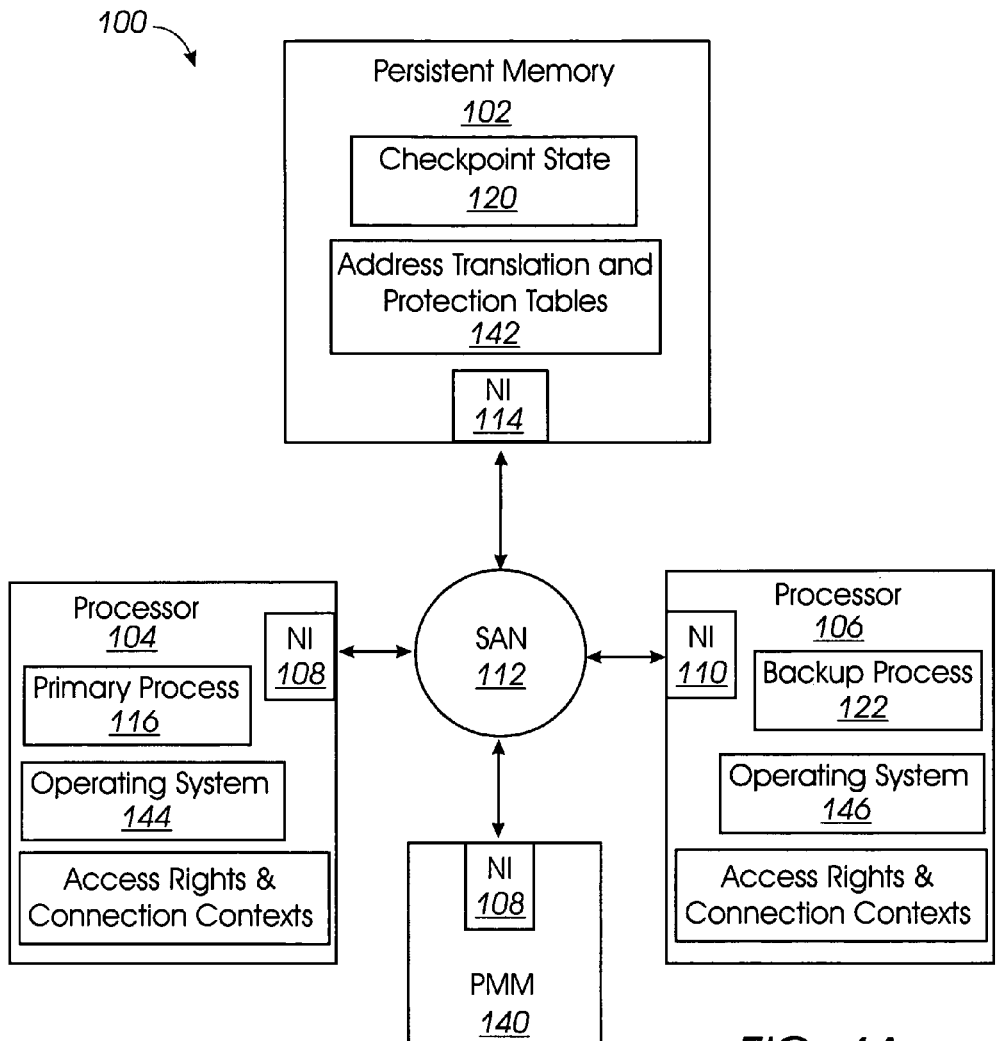
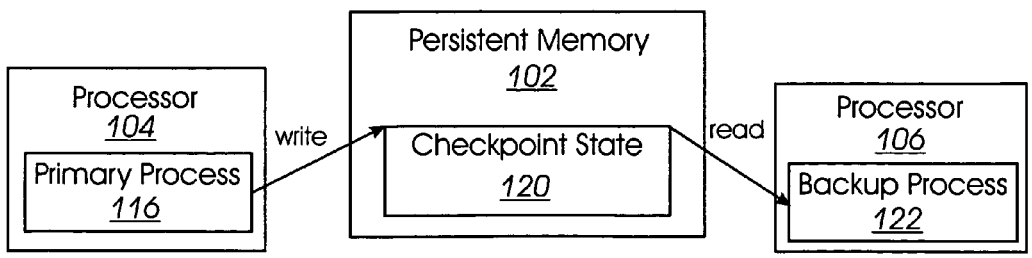
FIG. 1A
FIG. 1B

PERSISTENT MEMORY DEVICE FOR BACKUP PROCESS CHECKPOINT STATES

BACKGROUND

Failure of a computer, as well as application programs, executing on a computer can often result in the loss of significant amounts of data and intermediate calculations. The cause of failure can be either hardware or software related, but in either instance the consequences can be expensive, particularly when data manipulations are interrupted in mid-stream. In the case of large software applications, a failure might require an extensive effort to regenerate the status of the application's state prior to the failure.

Generally, checkpoint and restoration techniques periodically save the process state during normal execution, and thereafter restore the saved state to a backup process following a failure. In this manner, the amount of lost work is minimized to progress made by the application process since the restored checkpoint.

Traditionally, computers have stored the checkpoint data in either system memory coupled to the computer's processor, or on other input/output (I/O) storage devices such as magnetic tape or disk. I/O storage devices can be attached to a system through an I/O bus such as a PCI (originally named Peripheral Component Interconnect), or through a network such as Fiber Channel, Infiniband, ServerNet, or Ethernet. I/O storage devices are typically slow, with access times of more than one millisecond. They utilize special I/O protocols such as small computer systems interface (SCSI) protocol or transmission control protocol/internet protocol (TCP/IP), and typically operate as block exchange devices (e.g., data is read or written in fixed size blocks of data). A feature of these types of storage I/O devices is that they are persistent such that when they lose power or are re-started they retain the information stored on them previously. In addition, I/O storage devices can be accessed from multiple processors through shared I/O networks, even after some processors have failed.

As used herein, the term "persistent" refers to a computer memory storage device that can withstand a power reset without loss of the contents in memory. Persistent memory devices have been used to store data for starting or restarting software applications. In simple systems, persistent memory devices are static and not modified as the software executes. The initial state of the software environment is stored in persistent memory. In the event of a power failure to the computer or some other failure, the software restarts its execution from the initial state. One problem with this approach is that all intermediate calculations will have to be recomputed. This can be particularly onerous if large amounts of user data must be reloaded during this process. If some or all of the user data is no longer available, it may not be possible to reconstruct the pre-failure state.

System memory is generally connected to a processor through a system bus where such memory is relatively fast with guaranteed access times measured in tens of nanoseconds. Moreover, system memory can be directly accessed with byte-level granularity. System memory, however, is normally volatile such that its contents are lost if power is lost or if a system embodying such memory is restarted. Also, system memory is usually within the same fault domain as a processor such that if a processor fails, the attached memory also fails and may no longer be accessed. Metadata, which describes the layout of memory, is also lost when power is lost or when the system embodying such memory is restarted.

Prior art systems have used battery-backed dynamic random access memory (BBDRAM), solid-state disks, and network-attached volatile memory. Prior BBDRAM, for example, may have some performance advantages over true persistent memory. It is not, however, globally accessible. Moreover, BBDRAM that lies within the same fault domain as an attached CPU will be rendered inaccessible in the event of a CPU failure or operating system crash. Accordingly, BBDRAM is often used in situations where all system memory is persistent so that the system may be restarted quickly after a power failure or reboot. BBDRAM is still volatile during long power outages such that alternate means must be provided to store its contents before batteries drain. Importantly, this use of BBDRAM is very restrictive and not amenable for use in network-attached persistent memory applications, for example.

Battery-backed solid-state disks (BBSSD) have also been proposed for other implementations. These BBSSDs provide persistent memory, but functionally they emulate a disk drive. An important disadvantage of this approach is the additional latency associated with access to these devices through I/O adapters. This latency is inherent in the block-oriented and file-oriented storage models used by disks and, in turn, BBSSDs, which do not bypass the host computer's operating system. While it is possible to modify solid-state disks to eliminate some shortcomings, inherent latency cannot be eliminated because performance is limited by the I/O protocols and their associated device drivers. As with BBDRAM, additional technologies are required for providing the checkpoint state of an application program in a failed domain to a backup copy of the application program running in an operational domain.

SUMMARY

In some embodiments, a system includes a network interface attached to a persistent memory unit. The persistent memory unit is configured to receive checkpoint data from a primary process, and to provide access to the checkpoint data for use in a backup process to support recovery capability in the event of a failure of the primary process. The network interface is configured to provide address translation information between virtual and physical addresses in the persistent memory unit. In other embodiments, the persistent memory unit is capable of storing multiple updates to the checkpoint state. The checkpoint state and the updates to the checkpoint state, if any, can be retrieved by the backup process periodically, or all at once upon failure of the primary process.

In yet other embodiments, a method for recovering the operational state of a primary process includes mapping virtual addresses of a persistent memory unit to physical addresses of the persistent memory unit, and receiving checkpoint data regarding the operational state of the primary process in the persistent memory unit. In some embodiments, the checkpoint data is provided to a backup process. In still other embodiments, the context information regarding the addresses is provided to the primary process and the backup process.

In other embodiments, the persistent memory unit provides the checkpoint data to the backup process when the primary process fails. Alternatively, in still other embodiments, the persistent memory unit can be configured to store multiple sets of checkpoint data sent from the processor at successive time intervals, or to provide the multiple sets of checkpoint data to the backup process at one time.

These and other embodiments will be understood upon an understanding of the present disclosure by one of ordinary skill in the art to which it pertains.

BRIEF DESCRIPTION OF THE DRAWINGS

The accompanying drawings, which are incorporated in and form a part of this specification, illustrate embodiments of the invention and, together with the description, serve to explain its principles:

FIG. 1A is a block diagram of an embodiment of a system that includes a network attached persistent memory unit (NPMU) capable of storing checkpoint state information;

FIG. 1B is a diagram of an embodiment of one method for accessing checkpoint state information from the NPMU of FIG. 1A;

DETAILED DESCRIPTION

Figure 1C:
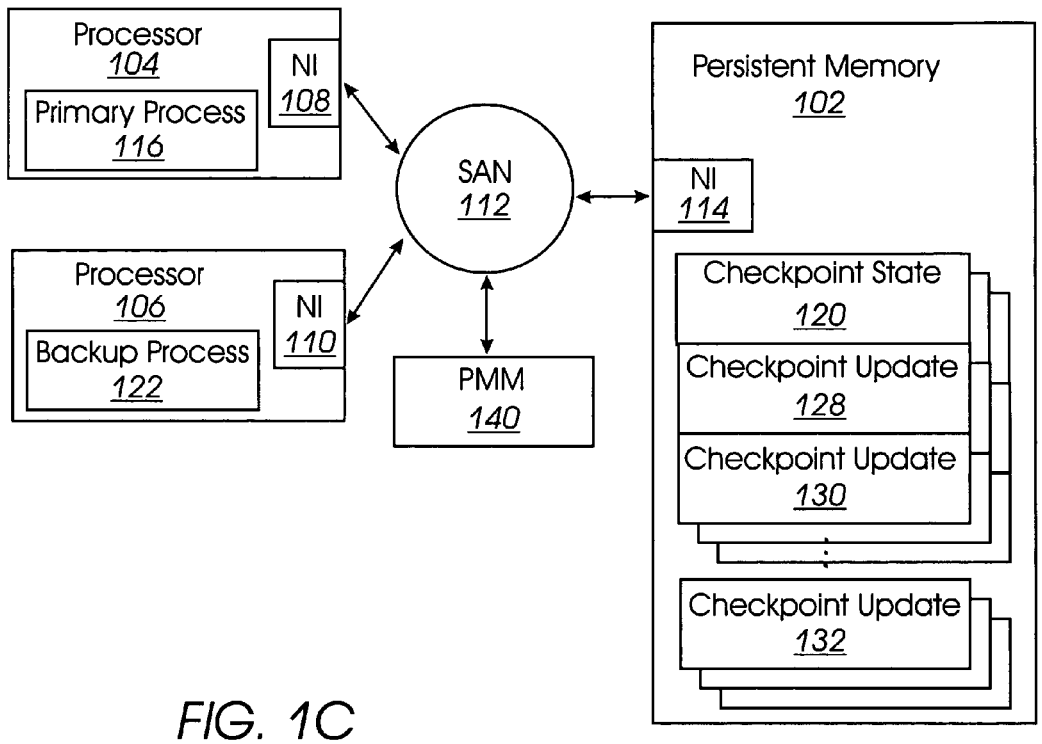
FIG. 1C is a block diagram of an embodiment of a system that includes a network attached persistent memory unit (NPMU) capable of storing multiple sets of checkpoint state information.

Whereas prior art systems have used persistent memory only in the context of block-oriented and file-oriented I/O architectures with their relatively large latencies, the present teachings describe memory that is persistent like traditional I/O storage devices, but that can be accessed like system memory with fine granularity and low latency. Systems according to the present teachings allow application programs to store one or more checkpoint states, which can be accessed by a backup copy of the application in the event of a hardware or software failure that prevents the primary application program from executing.

As shown in FIG. 1, a system 100 using network attached persistent memory includes a network-attached persistent memory unit (NPMU) 102 that can be accessed by one or more processor nodes 104, 106 through corresponding network interfaces (NI) 108, 110, and system area network (SAN) 112, such as a Remote Direct Memory Access (RDMA)-enabled SAN. RDMA can be implemented as a feature of NIs 108, 110, and 114 to enable processor nodes 104, 106 to directly store and retrieve information in the memory of NPMU 102. Transferring data directly to or from NPMU 102 eliminates the need to copy data between memory in processor nodes 104, 106 and kernel I/O processes in operating systems 144, 146. RDMA capability thus reduces the number of context switches between primary process 116 and backup process 122, and operating systems 144, 146 while handling memory transfers via SAN 112.

SAN 112 accesses NPMU 102 via network interface (NI) 114. NPMU 102 combines the durability and recoverability of storage I/O with the speed and fine-grained access of system memory. Like storage, the contents of NPMU 102 can survive the loss of power or system restart. Like remote memory, NPMU 102 can be accessed across SAN 112. However, unlike directly-connected memory, NPMU 102 can continue to be accessed even after one or more processor nodes 104, 106 have failed.

Primary process 116 running on processor node 104 can initiate remote commands, for example, a write command to send data for checkpoint state 120 in NPMU 102. Primary process 116 can also provide data for checkpoint state 120 periodically. Backup process 122 running on processor node 106 is configured to perform the functions of primary process 116 in the event of a failure of primary process 116. Backup process 122 can also initiate remote read and write operations to NPMU 102, such as a read command to access checkpoint state 120 periodically and/or upon failure of primary process 116.

In a write operation initiated by processor node 104, for example, once data has been successfully stored in NPMU 102, the data is durable and will survive a power outage or failure of processor node 104, 106. In particular, memory contents will be maintained as long as NPMU 102 continues to function correctly, even after the power has been disconnected for an extended period of time, or the operating system on processor node 104, 106 has been rebooted. In addition to data transfer operations, NPMU 102 can be configured to respond to various management commands.

In some embodiments, processor nodes 104, 106 are computer systems that include at least one central processing unit (CPU) and system memory wherein the CPU is configured to run operating systems 144, 146. Processor nodes 104, 106 can additionally be configured to run one or more of any type of application program, such as primary process 116 and backup process 118. Although system 100 is shown with two processor nodes 104, 106, additional processor nodes (not shown) can communicate with SAN 112 as well as with processor nodes 104, 106 over a network (not shown) via network interfaces 108, 110, 114.

In some embodiments, SAN 112 is a RDMA-enabled network connecting multiple network interface units (NI), such as NIs 108, 110, and 114 that can perform byte-level memory operations between two processor nodes 104, 106, or between processor nodes 104, 106 and a device such as NPMU 102, without notifying operating systems 144, 146. In this case, SAN 112 is configured to perform virtual to physical address translation to map contiguous network virtual address spaces onto discontiguous physical address spaces. This type of address translation allows for dynamic management of NPMU 102. Commercially available SANs 112 with RDMA capability include, but are not limited to, ServerNet, GigaNet, Infiniband, and all Virtual Interface Architecture compliant SANs.

Processor nodes 104, 106 are generally attached to SAN 112 through respective NIs 108, 110, however, many variations are possible. More generally, however, a processor node need only be connected to an apparatus for communicating read and write operations. For example, in another implementation of this embodiment, processor nodes 104, 106 include various CPUs on a motherboard that utilize a data bus, for example a PCI bus, instead of SAN 112. It is noted that the present teachings can be scaled up or down to accommodate larger or smaller implementations as needed.

Network interfaces (NI) 108, 110, 114 are communicatively coupled to NPMU 102 to allow for access to the persistent memory contained with NPMU 102. Any suitable technology can be utilized for the various components of FIG. 1A, including the type of persistent memory. Accordingly, the embodiment of FIG. 1A is not limited to a specific technology for realizing the persistent memory. Indeed, multiple memory technologies, including magnetic random access memory (MRAM), magneto-resistive random access memory (MR-RAM), polymer ferroelectric random access memory (PFRAM), ovonics unified memory (OUM), BBDRAM, and FLASH memories of all kinds may be appropriate. System 100 can be configured to allow high granularity memory access, including byte-level memory access, compared to BBSSDs, which transfer entire blocks of information.

Notably, memory access granularity can be adjusted as required in system 100. The access speed of memory in NPMU 102 should also be fast enough to support the transfer rates of the data communication scheme implemented for system 100.

It should be noted that persistent information is provided to the extent the persistent memory in use may hold data. For example, in many applications, persistent memory may be required to store data regardless of the amount of time power is lost; whereas in another application, persistent memory may only be required for a few minutes or hours.

Memory management functionality can be provided in system 100 to create one or more independent, indirectly-addressed memory regions. Moreover, NPMU meta-data can be provided for memory recovery after loss of power or processor failure. Meta-data can include, for example, the contents and layout of the protected memory regions within NPMU 102. In this way, NPMU 102 stores the data as well as the manner of using the data. When the need arises, NPMU 102 can provide the meta-data to backup process 122 to allow system 100 to recover from a power or system failure associated with primary process 116.

In the embodiment of system 100 shown in FIG. 1A, each update to checkpoint state 120 can overwrite some or all of the information currently stored for checkpoint state 120. Since there is only one copy of checkpoint state 120, backup process 122 can remain idle until primary process 116 fails, and then read checkpoint state 120 to continue the functions that were being performed by primary process 116. FIG. 1B is a diagram of an embodiment of a method for accessing checkpoint state 120 from NPMU 102. As shown, primary process 116 writes data to the beginning address of checkpoint state 120, and backup process 122 reads data from the beginning of checkpoint state 120. In such an embodiment, only one copy of checkpoint state 120 needs to be maintained.

FIG. 1C shows another embodiment of NPMU 102 configured with multiple checkpoint update areas 128-132 associated with checkpoint state 120. Checkpoint state 120 can include a full backup state for primary process 116. Each update to checkpoint state 120 can be appended to the previously written information, thereby creating a series of updates to checkpoint state 120 in non-overlapping update areas 128-132 of NPMU 102. When checkpoint state 120 is relatively large, update areas 128-132 provide a benefit of eliminating the need for primary process 116 to write a complete checkpoint state 120 each time information is checkpointed.

For example, primary process 116 may read in large blocks of data during initialization, and update various segments of the data at different phases of operation. The initial checkpoint state 120 can include a backup of all the data, while update areas 128-132 can be used to store smaller segments of the data as the segments are updated. Backup process 122 can then initialize itself with checkpoint state 120, and apply data from the subsequent update areas 128-132 in the order they were written. Further, backup process 122 does not have to wait until primary process 116 fails to begin initializing itself with data from checkpoint state 120 and update areas 128-132. This is especially true when there is potential to overflow the amount of storage space available for checkpoint state 120 and update areas 128-132. This is also true when it would take a greater amount of time than desired for backup process 122 to recreate the state of primary process 116 after primary process 116 fails.

Figure 1D:
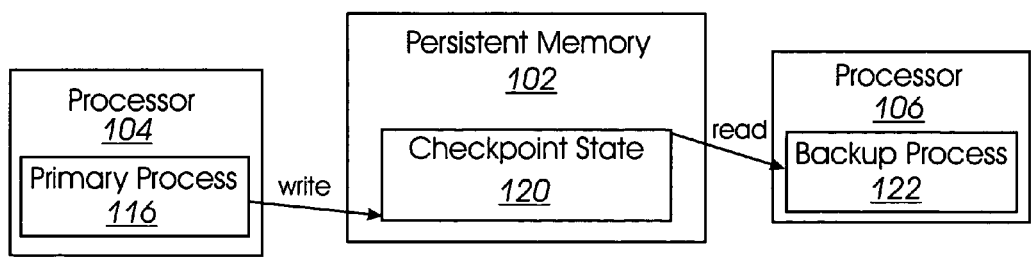
FIG. 1D is a diagram of an embodiment of another method for accessing checkpoint state information from the NPMU of FIG. 1C.

FIG. 1D is a diagram of an embodiment of a method for accessing checkpoint state 120 from NPMU 102 of FIG. 1C. As shown, primary process 116 appends data to the address of checkpoint state 120 and update areas (not shown) following the address where data was last written to NPMU 102. Backup process 122 reads data from the beginning to the end of the last area that was written by primary process 116. In such embodiments, facilities are provided to provide backup process 122 with the starting and ending location of the most current update to checkpoint state 120, as further discussed herein.

Whether backup process 122 reads checkpoint state 120 and update areas 128-132 periodically, or when primary process 116 fails, backup process 122 can read any previously unread portion of checkpointed state 120 and update areas 128-132 before taking over for primary process 116.

Utilizing NPMU 102 allows primary process 116 to store checkpoint state 120 regardless of the identity, location, or operational state of backup process 122. Backup process 122 can be created in any remote system that has access to NPMU 102. Primary process 116 can write checkpoint state 120 and/or update areas 128-132 whenever required without waiting for backup process 122 to acknowledge receipt of messages. Additionally, NPMU 102 allows efficient use of available information technology (IT) resources since backup process 122 only needs to execute when either (1) primary process 116 fails; or (2) to periodically read information from checkpoint state 120 and/or update areas 128-132 to avoid overflowing NPMU 102. In contrast, some previously known checkpointing techniques utilize message passing between a primary process and a backup process to communicate checkpoint information. The primary process thus required information regarding the identity and location of the backup process. Additionally, the backup process had to be operational in previously known systems in order to synchronize with the primary process to receive the checkpoint message.

Further, NPMU 102 can be implemented in hardware, thereby providing fast access for read and write operations. Other previously known checkpointing techniques store checkpoint information on magnetic or optical media, which requires much more time to access than NPMU 102.

Figure 2:
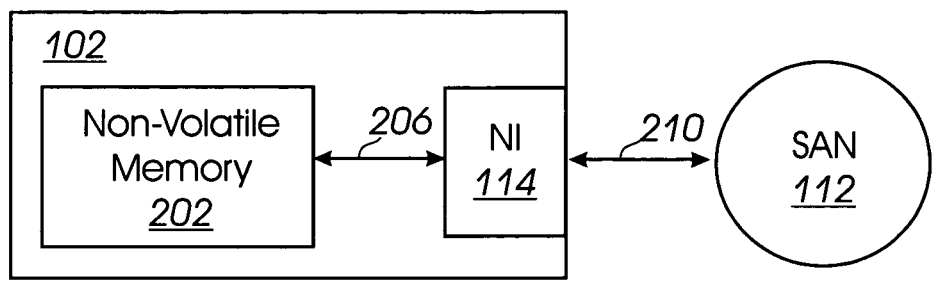
FIG. 2 is a block diagram of an embodiment of a network attached persistent memory unit (NPMU)

FIG. 2 shows an embodiment of NPMU 102 that uses non-volatile memory 202 communicatively coupled to NI 114 via a communications link 206. Non-volatile memory 202 can be, for example, MRAM or Flash memory. NI 114 typically does not initiate its own requests, but instead NI 114 receives management commands from SAN 112 via communication link 210, and carries out the requested management operations. Specifically, NPMU 200 can translate incoming requests and then carry out the requested operation. Further details on command processing will be discussed below. Communication links 206, 210 can be configured for wired and/or wireless communication. SAN 112 can be any suitable communication and processing infrastructure between NI 114 and other nodes such as processor nodes 104, 106 in FIG. 1A. For example, SAN 112 can be a local area network, and/or wide area network such as the Internet.

Figure 3:
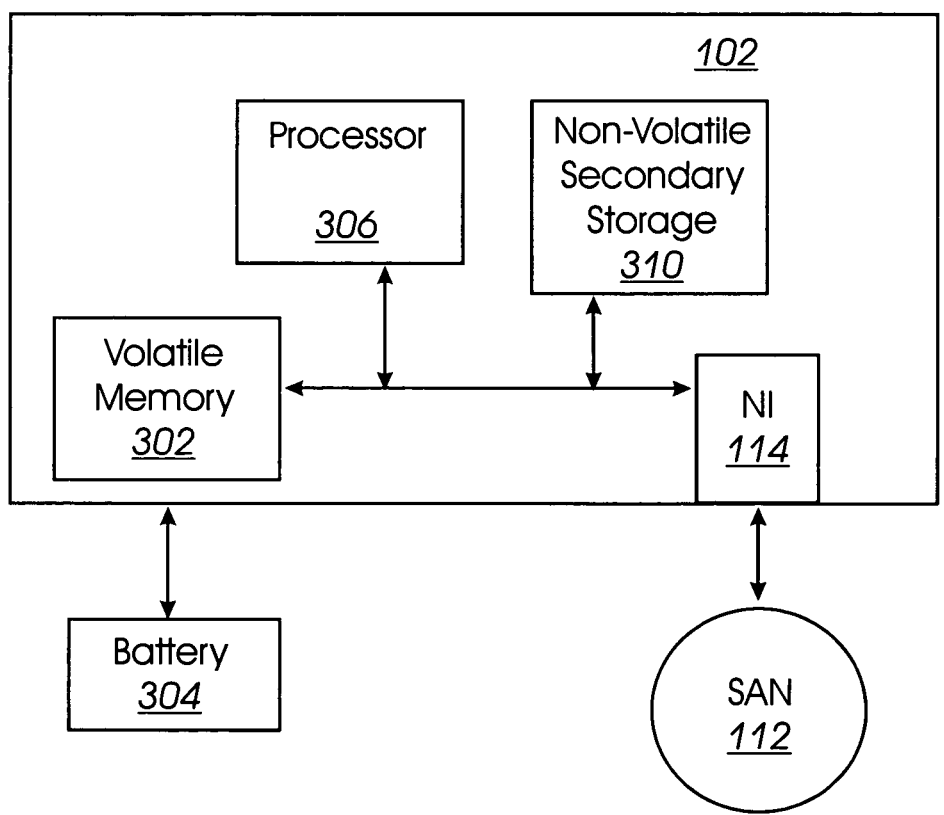
FIG. 3 is a block diagram of an embodiment of a network attached persistent memory unit (NPMU) using battery backup.

FIG. 3 shows another embodiment of NPMU 102 using a combination of volatile memory 302 with battery 304 and a non-volatile secondary store 310. In this embodiment, when power fails, the data within volatile memory 302 is preserved using the power of battery 304 until such data can be saved to non-volatile secondary store 310. Non-volatile secondary store can be, for example, a magnetic disk or slow FLASH memory. The transfer of data from volatile memory 302 to non-volatile secondary memory store 310 can occur without external intervention or any further power other than from battery 304. Accordingly, any required tasks are typically completed before battery 304 completely discharges. As shown, NPMU 120 includes optional CPU 306 running an embedded operating system. Accordingly, the backup task (i.e., data transfer from volatile memory 302 to non-volatile secondary memory store 310) can be performed by software running on CPU 306. NI 114 initiates requests under the control of software running on CPU 306. CPU 306 can receive management commands from the network and carry out the requested management operation.

Various embodiments of NPMU 102 can be managed to facilitate resource allocation and sharing. In some embodiments, NPMU 102 is managed by persistent memory manager (PMM) 140, as shown in FIG. 1A. PMM 140 can be located internal or external to NPMU 102. When PMM 140 is internal to NPMU 102, processor nodes 104, 106 can communicate with PMM 140 via SAN 112 and network interface (NI) 114 to perform requested management tasks, such as allocating or de-allocating regions of persistent memory of NPMU 102, or to use an existing region of persistent memory. When PMM 140 is external to NPMU 102, processor nodes 104, 106 can issue requests to NPMU 102, and NPMU 102 can interface with PMM 104 via NI 114, SAN 112, and NI 141 associated with PMM 140. As a further alternative, processor nodes 104, 106 can communicate directly with PMM 140 via NI 108, 110, respectively, and SAN 112 and NI 141. PMM 140 can then issue the appropriate commands to NPMU 102 to perform requested management tasks.

Note that because NPMU 102 can be durable, and can maintain a self-describing body of persistent data, meta-data related to existing persistent memory regions can be stored on NPMU 102. PMM 140 can perform management tasks that will keep the meta-data on NPMU 102 consistent with the persistent data stored on NPMU 102. In this manner, the NPMU's stored data can always be interpreted using the NPMU's stored meta-data and thereby recovered after a possible system shutdown or failure. NPMU 102 thus maintains in a persistent manner not only the data being manipulated but also the state of the processing of such data. Upon a need for recovery, system 100 using an NPMU 102 is thus able to recover and continue operation from the memory state in which a power failure or operating system crash occurred.

Figure 4:
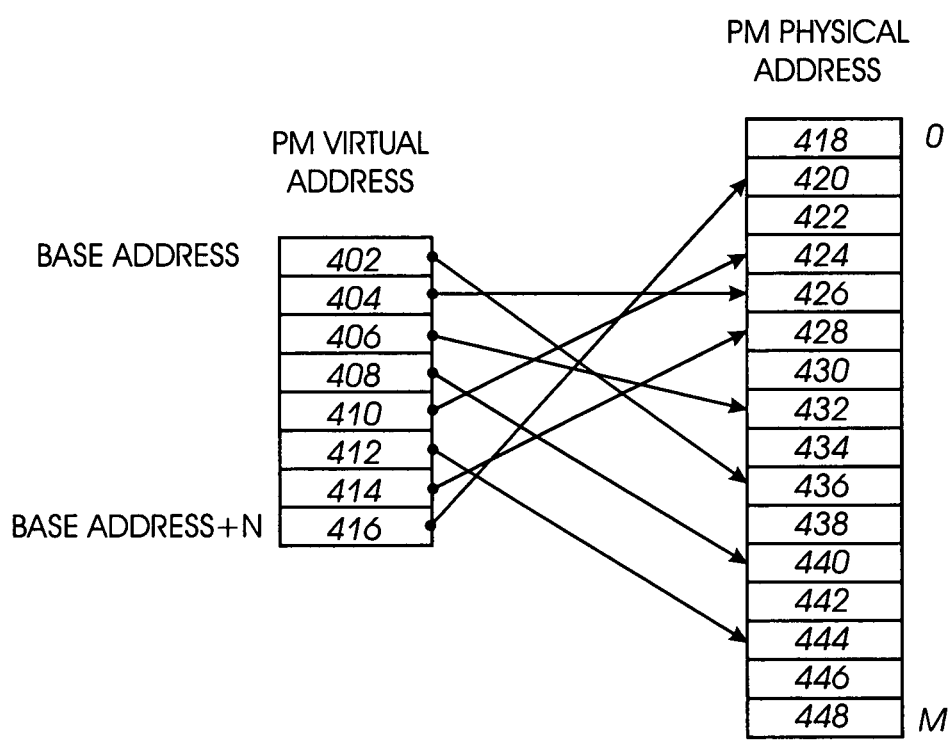
FIG. 4 is a block diagram illustrating mappings from a persistent memory virtual address space to a persistent memory physical address space.

As described with reference to FIG. 1A, SAN 112 provides basic memory management and virtual memory support. In such an implementation, PMM 140 can program the logic in NI 114 to enable remote read and write operations, while simultaneously protecting the persistent memory from unauthorized or inadvertent accesses by all except a select set of entities on SAN 112. Moreover, as shown in FIG. 4, NPMU 102 can support virtual-to-physical address translation. For example, a continuous virtual address space such as persistent memory (PM) virtual addresses 402-416 can be mapped or translated to discontinuous persistent memory physical addresses 418-448. PM virtual addresses can be referenced relative to a base address through N incremental addresses. Such PM virtual addresses, however, can also correspond to discontiguous PM physical addresses.

As shown, PM virtual address 402 can actually correspond to a PM physical address 436, and so on. Accordingly, NPMU 102 can provide the appropriate translation from the PM virtual address space to the PM physical address space and vice versa. In this way, the translation mechanism allows NPMU 102 to present contiguous virtual address ranges to processor nodes 104, 106, while still allowing dynamic management of the NPMU's physical memory. This can be important because of the persistent nature of the data on an NPMU 102. Due to configuration changes, the number of processes accessing a particular NPMU 102, or possibly the sizes of their respective allocations, may change over time. The address translation mechanism allows NPMU 102 to readily accommodate such changes without loss of data. The address translation mechanism further allows easy and efficient use of persistent memory capacity by neither forcing the processor nodes 104, 106 to anticipate future memory needs in advance of allocation or forcing the processor nodes 104, 106 to waste persistent memory capacity through pessimistic allocation.

With reference again to FIG. 1A, a ServerNet SAN operating in its native access validation and translation block transfer engine (AVT/BTE) mode is an example of a single address space SAN 112. Each target on such SAN presents the same, flat network virtual address space to all components that issue requests to SAN 112, such as processor nodes 104, 106. Network virtual address ranges can be mapped by the target from PM virtual address to PM physical address ranges with page granularity. Network PM virtual address ranges can be exclusively allocated to a single initiator (e.g., processor node 104), and multiple PM virtual addresses can point to the same physical page.

When processor node 104 requests PMM 140 to open (i.e., allocate and then begin to use) a region of persistent memory in NPMU 102, NPMU's NI 114 can be programmed by PMM 140 to allow processor node 104 to access the appropriate region. This programming allocates a block of network virtual addresses and maps (i.e., translates) them to a set of physical pages in physical memory. The range of PM virtual addresses can be contiguous regardless how many pages of PM physical address are to be accessed. The physical pages can, however, be anywhere within the PM physical memory. Upon successful set-up of the translation, NPMU 102 can notify the requesting processor node 104 of the PM virtual address of the contiguous block. Once open, processor node 104 can access NPMU memory pages by issuing read or write operations to NPMU 102. NPMU 102 can also notify subsequent requesting processor nodes 106 that wish to access data provided by processor node 104 of the virtual address of corresponding memory. PMM 140 can translate the virtual address to the corresponding physical address of the memory to provide requested information, such as checkpoint state 120 and/or update areas 128-132, to backup process 122 in processor 106.

In some embodiments, backup process 122 can be configured with information regarding the location of checkpoint state 120 and/or update areas 128 -132. In other embodiments, backup process 122 can issue a message requesting the location of checkpoint state 120 and update areas 128-132 from PMM 140, NPMU 102, and/or primary process 116 at runtime. PMM 140, NPMU 102, and/or primary process 116 then issue a response message with the requested location of checkpoint state 120 and update areas 128-132 in NPMU 102. In some embodiments, PMM 140 records information regarding the starting and ending address of the latest update to checkpoint state 120, whether the latest information resides in checkpoint state 120 or update areas 128-132. The starting and ending addresses of the most current checkpoint state 120 and update areas 128-132 can then be provided upon request to backup process 122. Permission to access memory resources in NPMU 102 can be maintained in Translation and Protection Table (TPT) 142, which is shown in NPMU 102. PMM 140 can create entries in TPT 142 with appropriate permissions at the time of creating or opening persistent memory regions. For instance, primary process 116 requests PMM 140 to create a region with permissions to write. Subsequently, backup process 122 opens that region with permissions to read.

Primary process 116 and backup process 122 can communicate with PMM 140 and access NPMU 102 through their respective NIs. Respective operating systems (OS) 144, 146 in processors 104, 106 manage not only access to NIs 108, 110, but also maintain context information about the connections created through that NI 108, 110. Information regarding access right and connection contexts can be stored by respective processors 104, 106.

Primary process 116 and backup process 122 must obtain permission from their respective operating systems 144, 146 in order to send requests to PMM 140 to open or create a region in NPMU 102. PMM 140 sets up appropriate entries in TPT 142 and returns the granted access rights to the requestor.

Only after the access rights have been obtained will respective operating systems 144, 146 allow primary process 116 or backup process 122 to write or read the physical memory contents from NPMU 102 within their open regions. The access rights are enforced by NI 114, which configures its state from entries in TPT 142 maintained by PMM 140 at NPMU 102.

In some embodiments, if primary process 116 or backup process 122 chooses to establish a connection with NPMU 102, and then sends write or read requests over that connection, the access rights can be 'bound' to the connection and need not be repeated with each request. If primary process 116 and backup process 122 choose to send requests to the NPMU 102 without first establishing a connection, then each request can include the authentication information contained in the access rights.

NPMU 102 can directly authenticate PMM 140. A variety of implementation schemes can be utilized. In some embodiments, PMM 140 takes ownership of certain NPMUs 102 when a particular NPMU 102 is first connected to SAN 112. In such a situation, PMM 140 initializes TPT 142 on NPMU 102 to grant itself write permission into TPT 142. Other embodiments can utilize password-based authentication, in which NPMU 102 validates requests from PMM 140 using a pre-configured password known only to PMMs 140. A variety of other schemes are possible, including certificate-based authentication, which requires SAN 112 to support a third party authentication service to authenticate the communicating entities to each other.

The further functionality of the present approach as shown, for example, in FIG. 1A can now be understood. For example, once processor node 104 has communicated with PMM 140 to open a memory region, processor node 104 can then directly access the memory of NPMU 102 without going through PMM 140. For example, a remote read command provides a starting network virtual address and offset as well as a context identifier (in the case of multiple address spaces). For proper operation, this address range should be within the range allocated by PMM 140. Processor node 104 provides to NI 108 a remote read command containing a pointer to a local physical memory location at node 104. NI 108 in the requesting processor node 104 then transmits the remote read command to NI 114 of NPMU 102 via SAN 112. NI 114 translates the starting network virtual address to a physical address within NPMU 102 using translation tables associated with the region. By means of NI 114, NPMU 102 then returns data to the reading processor node starting at the translated physical address. NI 114 continues translating addresses even if NPMU 102 reaches page boundaries since the physical pages of contiguous PM virtual addresses do not necessarily translate to contiguous PM physical addresses. When the read command is completed, NI 108 marks the read transfer as completed. Moreover, any waiting processes can be notified and, in turn, processed.

A remote write to persistent memory is similar. Processor node 104 provides a starting PM network virtual address and offset as well as a context identifier (in the case of multiple address spaces) for NPMU 102. As before, the PM network virtual address range must fall within the allocated range. Processor node 104 also provides a pointer to the physical address of the data to be transmitted. NI 108 in processor node 104 then issues a remote write command to NI 114 in NPMU 102 and begins sending data. NI 114 translates the start address to a physical address in NPMU 102 using translation tables associated with the region. Also, NPMU 102 stores data starting at the translated physical address. NI 114 continues translating addresses even if NPMU 102 reaches page boundaries since the physical pages of contiguous PM network virtual addresses do not necessarily translate to contiguous PM physical addresses. When the write command is completed, NI 108 marks the write transfer as completed. Any waiting processes can then be notified and, in turn, processed.

It should be noted that in latency testing of one embodiment of NPMU 102 according to the present teachings, memory accesses well within 80 microseconds could be achieved. The performance of NPMU 102 compares very favorably to alternative I/O operations requiring over eight hundred microseconds. Indeed this result is possible because the latencies of I/O operations, including their necessary interrupts, are avoided. The NPMU according to the present teachings therefore has the persistence of storage with the fine-grained access of system memory.

Figure 5:
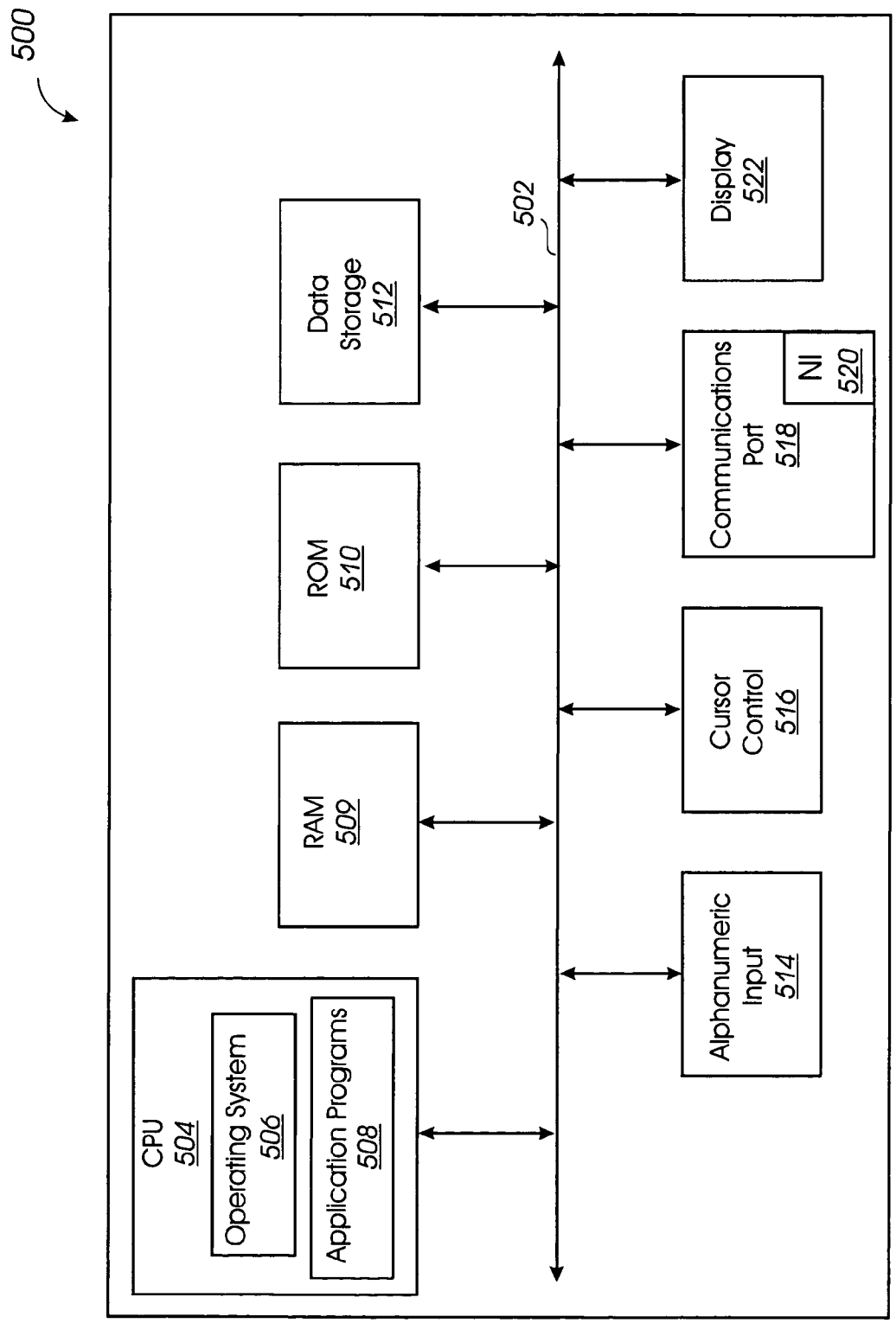
FIG. 5 is a block diagram of an illustrative computer system on which a network attached persistent memory unit (NPMU) can be implemented.

In some embodiments, processor units 104, 106, NPMU 102, and PMM 140 can be implemented on a computer system 500 such as shown in FIG. 5. Computer system 500 is typically configured with a data bus 502 that communicatively couples various components. As shown in FIG. 5, central processing unit (CPU)504 is coupled to bus 502 for processing information and instructions, such as operating system 506 and one or more application programs 508. For example, operating system 506 can represent operating systems 144 or 146 (FIG. 1A), and application programs 508 can include primary process 116 or backup process 122 (FIG. 1A).

A computer readable volatile memory such as random access memory (RAM) 509 can also be coupled to bus 502 to load information and instructions to be executed by CPU 504. Moreover, computer-readable read only memory (ROM) 510 can also be coupled to bus 502 to store static information and instructions that can be accessed by CPU 504. A data storage device 512 such as a magnetic or optical disk media can also be coupled to bus 502 to store large amounts of information and instructions. An alphanumeric input device 514 including alphanumeric and function keys, and a cursor control device 516 such as a mouse, can be coupled to bus 502 to enable a user to input information and commands to CPU 504.

One or more communications ports 518 can be included in system 500 to enable communication with various peripheral devices such as printers; external networks such as SAN 112; and other processing systems such as processor nodes 104, 106 (FIG. 1A), for example. Communications port 518 can also be coupled to network interface (NI) 520 to enable communication with external networks. NI 520 can represent NI 108, 114, 141, or 110 in FIG. 1A, for example.

Display 522 can be coupled to bus 502 to display information to a user of system 500. Display 522 may be a liquid crystal device, cathode ray tube, or other display device suitable for creating graphic images and alphanumeric characters recognizable by the user. The alphanumeric input device 514 and cursor control device 516 allow the computer user to dynamically signal the two dimensional movement of a visible symbol (pointer) on display 522.

In some embodiments, components in computer system 500 can communicate with each other and with other external networks via suitable interface links such as any one or combination of TI, ISDN, cable line, a wireless connection through a cellular or satellite network, or a local data transport system such as Ethernet or token ring over a local area network. Any suitable communication protocol, such as Hypertext Transfer Protocol (HTTP) or Transfer Control Protocol/Internet Protocol (TCT/IP), can be utilized to communicate with other components in external networks. Additionally, computer system 500 can be embodied in any suitable computing device, and so include personal data assistants (PDAs), telephones with display areas, network appliances, desktops, laptops, X-window terminals, or other such computing devices.

Logic instructions can be stored on a computer readable medium, or accessed in the form of electronic signals. The logic modules, processing systems, and circuitry described herein may be implemented using any suitable combination of hardware, software, and/or firmware, such as Field Programmable Gate Arrays (FPGAs), Application Specific Integrated Circuit (ASICs), or other suitable devices. The logic modules can be independently implemented or included in one of the other system components. Similarly, other components are disclosed herein as separate and discrete components. These components may, however, be combined to form larger or different software modules, logic modules, integrated circuits, or electrical assemblies, if desired.

While the present disclosure describes various embodiments, these embodiments are to be understood as illustrative and do not limit the claim scope. Many variations, modifications, additions and improvements of the described embodiments are possible. For example, those having ordinary skill in the art will readily implement the processes necessary to provide the structures and methods disclosed herein. Variations and modifications of the embodiments disclosed herein may also be made while remaining within the scope of the following claims. The functionality and combinations of functionality of the individual modules can be any appropriate functionality. In the claims, unless otherwise indicated the article "a" is to refer to "one or more than one".

We claim:

1. A system for storing checkpoint data comprising:
a network interface to an external network; and
a persistent memory unit coupled to the network interface, the persistent memory unit to:
receive the checkpoint data directly into a region of the persistent memory unit via a remote direct memory access (RDMA) write command issued by a first node executing a primary process, wherein the first node is connected to the network interface through the external network, and
provide direct access to the checkpoint data in the region of the persistent memory unit via a remote direct memory access (RDMA) read command issued by a second node executing a backup process, wherein the second node is connected to the network interface through the external network, wherein the remote direct memory access (RDMA) write command issued by the first node is preceded by a create request for the region, wherein the RDMA read command issued by the second node is preceded by an open request for the region, and wherein the backup process performs a function of the primary process in response to a failure of the primary process.

2. The system of claim 1, further comprising:
a persistent memory manager configured to program the network interface with information used by the network interface to perform virtual-to-physical address translation.

3. The system of claim 1, wherein the create request for the region is issued by the first node, and wherein the open request for the region is issued by the second node.

4. The system of claim 1, wherein the RDMA read command is issued after the primary process fails.

5. The system of claim 1, wherein the persistent memory unit is to store multiple sets of checkpoint data through remote direct memory access (RDMA) writes sent from the first node at successive time intervals.

6. The system of claim 5, wherein the persistent memory unit provides the multiple sets of checkpoint data through remote direct memory access (RDMA) reads upon request by the backup process at one time.

7. The system of claim 1, wherein the primary process provides the checkpoint data to the persistent memory unit independently from the backup process.

8. The system of claim 1, wherein the persistent memory unit is configured as part of a remote direct memory access-enabled system area network.

9. The system of claim 1, wherein the persistent memory unit is configured with address protection and translation tables to authenticate requests from remote processors, and to provide access information to authenticated remote processors.

10. The system of claim 1, wherein the persistent memory unit is further to store meta-data regarding the contents and layout of memory regions within the persistent memory unit and to keep the meta-data consistent with the checkpoint data stored on the persistent memory unit.

11. The system of claim 1, wherein the persistent memory unit is further to provide access to the checkpoint data in another region via a remote direct memory access (RDMA) read command from the backup process through the network interface, wherein the RDMA read command is preceded by an open request for the another region.

12. The method of claim 1, wherein the checkpoint data received by the persistent memory unit overwrites a current set of the checkpoint data.

13. The method of claim 1, wherein the checkpoint data received by the persistent memory unit is appended to a previous set of the checkpoint data.

14. A system for storing checkpoint data comprising:
a network interface to an external network; and
a persistent memory unit coupled to the network interface, the persistent memory unit to:
receive the checkpoint data into a region of the persistent memory unit via a remote direct memory access (RDMA) write command issued by a first node executing a primary process, wherein the first node is connected to the network interface through the external network, and
provide access to the checkpoint data in the region of the persistent memory unit via a remote direct memory access (RDMA) read command issued by a second node executing a backup process, wherein the second node is connected to the network interface through the external network, wherein the remote direct memory access (RDMA) write command is preceded by a create request for the region, wherein the RDMA read command is preceded by an open request for the region, wherein the backup process is to perform a function of the primary process in response to a failure of the primary process, wherein the primary process is to directly write the checkpoint data to the persistent memory via the remote direct memory access (RDMA) write command without notifying an operating system of the first node, wherein the backup process is to directly read the checkpoint data from the persistent memory via the RDMA read command without notifying an operating system of the second node, and wherein the primary process provides the checkpoint data to the persistent memory unit independently from the backup process.

15. The system of claim 14, further comprising:
a persistent memory manager configured to program the network interface with information used by the network interface to perform virtual-to-physical address translation.

16. The system of claim 14, wherein the persistent memory unit is further configured to store a starting and ending address of the checkpoint data and provide access to the starting and ending address to the backup process.

17. The system of claim 14, wherein the persistent memory unit is further configured to provide access to the checkpoint data in another region via a remote direct memory access (RDMA) read command from the backup process through the network interface, wherein the RDMA read command is preceded by an open request for the another region.

18. The system of claim 14, wherein the persistent memory unit provides the checkpoint data through remote direct memory access (RDMA) reads by the backup process after the primary process fails.

19. The system of claim 14, wherein the persistent memory unit is further to store multiple sets of checkpoint data through remote direct memory access (RDMA) writes sent from the first node at successive time intervals.

20. A system for storing checkpoint data comprising:
a network interface to an external network; and
a persistent memory unit coupled to the network interface, wherein the persistent memory unit is configured to:
receive the checkpoint data into a region of the persistent memory unit via a remote direct memory access (RDMA) write command from a first node executing a primary process, wherein the first node is connected to the network interface through the external network,
provide access to the checkpoint data in the region via a remote direct memory access (RDMA) read command from a second node executing a backup process, wherein the second node is connected to the network interface through the external network,
store meta-data regarding the contents and layout of memory regions within the persistent memory unit, and
keep the meta-data consistent with the checkpoint data stored on the persistent memory unit,
wherein the remote direct memory write command is preceded by a create request for the region and the read command is preceded by an open request for the region, wherein the backup process is to perform a function of the primary process in response to a failure of the primary process, wherein the primary process is to directly write the checkpoint data to the persistent memory via the remote direct memory access (RDMA) write command without notifying an operating system of the first node, wherein the backup process is to directly read the checkpoint data from the persistent memory via the RDMA read command without notifying an operating system of the second node, and wherein the primary process provides the checkpoint data to the persistent memory unit independently from the backup process.

21. The system of claim 20, wherein the checkpoint data received by the persistent memory unit overwrites a current set of the checkpoint data.

22. The system of claim 20, wherein the checkpoint data received by the persistent memory unit is appended to a previous set of the checkpoint data.

23. The system of claim 20, wherein the persistent memory unit is further configured to store a starting and ending address of the checkpoint data and provide access to the starting and ending address to the backup process.

24. The system of claim 20, further comprising:
a persistent memory manager configured to grant access rights to the primary process prior to persistent memory unit receiving the create request.

25. The system of claim 20, further comprising:
a persistent memory manager configured to grant access rights to the backup process prior to persistent memory unit receiving the open request.

26. A system for storing checkpoint data comprising:
a network interface to an external network; and
a persistent memory unit coupled to the network interface, wherein the persistent memory unit is configured to
receive the checkpoint data into a region of the persistent memory unit via a remote direct memory access (RDMA) write command issued by a first processor executing a primary process, wherein the first processor is connected to the network interface through the external network interface,
provide access to the checkpoint data in the region via a remote direct memory access (RDMA) read command issued by a second processor executing a backup process, wherein the second processor is connected to the network interface through the external network,
authenticate requests from remote processors with address protection and translation tables, and
provide access information to authenticated remote processors,
wherein the remote direct memory access (RDMA) write command is preceded by a create request for the region and the RDMA read command is preceded by an open request for the region,
wherein the backup process is to perform a function of the primary process in response to a failure of the primary process,
wherein the primary process is to directly write the checkpoint data to the persistent memory via the remote direct memory access (RDMA) write command,
wherein the backup process is to directly read the checkpoint data from the persistent memory via the RDMA read command, and wherein the primary process provides the checkpoint data to the persistent memory unit independently from the backup process.

27. The system of claim 26, further comprising:
a persistent memory manager configured to grant access rights to the primary process prior to persistent memory unit receiving the create request.

28. The system of claim 27, wherein the access rights are bound to a connection between the primary process and the persistent memory unit such that the access rights need not be repeated with each create request.

29. The system of claim 26, further comprising:
a persistent memory manager configured to grant access rights to the backup process prior to persistent memory unit receiving the open request.

30. The system of claim 29, wherein the access rights are bound to a connection between the backup process and the persistent memory unit such that the access rights need not be repeated with each open request.

31. The system of claim 26, wherein the persistent memory unit is further configured to store a starting and ending address of the checkpoint data and provide access to the starting and ending address to the backup process.

32. A system for storing checkpoint data comprising:
a network interface to an external network; and
a persistent memory unit coupled to the network interface, wherein the persistent memory unit is configured to
receive the checkpoint data into a region of the persistent memory unit via a remote direct memory access (RDMA) write command from a first processor node executing a primary process, wherein the first processor node is connected to the network interface through the external network interface,
provide access to the checkpoint data in the region of the persistent memory unit via a remote direct memory access (RDMA) read command from a second processor node executing a backup process, wherein the second processor node is connected to the network interface through the external network,
authenticate requests from remote processor nodes with address protection and translation tables, to provide access information to authenticated remote processor nodes,
store meta-data regarding the contents and layout of memory regions within the persistent memory unit, and
keep the meta-data consistent with the checkpoint data stored on the persistent memory unit,
wherein the remote direct memory access (RDMA) write command is preceded by a create request for the region and the RDMA read command is preceded by an open request for the region,
wherein the backup process is to perform a function of the primary process in response to a failure of the primary process,
wherein the primary process of the first processor node is to directly write the checkpoint data to the persistent memory via the remote direct memory access (RDMA) write command,
wherein the backup process of the second processor node is to directly read the checkpoint data from the persistent memory via the RDMA read command, and
wherein the primary process provides the checkpoint data to the persistent memory unit independently from the backup process.

33. The system of claim 32, wherein the persistent memory unit is further configured to store a starting and ending address of the checkpoint data and provide access to the starting and ending address to the backup process.

34. The system of claim 32, wherein the persistent memory unit is further configured to provide access to the checkpoint data in another region via a remote direct memory access (RDMA) read command from the backup process through the network interface, wherein the RDMA read command is preceded by an open request for the another region.

35. The system of claim 32, further comprising:
a persistent memory manager configured to grant access rights to the primary process prior to persistent memory unit receiving the create request.

36. The system of claim 32, further comprising:
a persistent memory manager configured to grant access rights to the backup process prior to persistent memory unit receiving the open request.

37. The system of claim 32, wherein the checkpoint data received by the persistent memory unit overwrites a current set of the checkpoint data.

* * * * *

UNITED STATES PATENT AND TRADEMARK OFFICE
CERTIFICATE OF CORRECTION

PATENT NO. : 9,213,609 B2
APPLICATION NO. : 10/737374
DATED : December 15, 2015
INVENTOR(S) : Roger Hansen et al.

Page 1 of 1

It is certified that error appears in the above-identified patent and that said Letters Patent is hereby corrected as shown below:

Claims

In column 14, line 37, in Claim 26, delete "configured to" and insert -- configured to: --, therefor.

In column 14, line 43, in Claim 26, delete "network interface," and insert -- network, --, therefor.

In column 15, line 28, in Claim 32, delete "configured to" and insert -- configured to: --, therefor.

Signed and Sealed this
Third Day of May, 2016

Michelle K. Lee
*Director of the United States Patent and Trademark Office*